(12) United States Patent
Tokuhara

(10) Patent No.: US 12,030,582 B2
(45) Date of Patent: Jul. 9, 2024

(54) PROCESSING DEVICE, VEHICLE HEIGHT ADJUSTMENT DEVICE, AND SADDLE-TYPE VEHICLE

(71) Applicant: Hitachi Astemo, Ltd., Hitachinaka (JP)

(72) Inventor: Masato Tokuhara, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 289 days.

(21) Appl. No.: 17/697,524

(22) Filed: Mar. 17, 2022

(65) Prior Publication Data
US 2022/0204122 A1 Jun. 30, 2022

Related U.S. Application Data

(63) Continuation of application No. PCT/JP2020/005288, filed on Feb. 12, 2020.

(51) Int. Cl.
*B62K 25/04* (2006.01)
*B60G 17/016* (2006.01)
*B60G 17/027* (2006.01)

(52) U.S. Cl.
CPC ........ *B62K 25/04* (2013.01); *B62K 2025/044* (2013.01); *B62K 2025/045* (2013.01)

(58) Field of Classification Search
CPC ............... B60G 2800/914; B60G 2400/25
See application file for complete search history.

(56) References Cited

U.S. PATENT DOCUMENTS

| | | | |
|---|---|---|---|
| 5,184,841 A | 2/1993 | Pischke et al. | |
| 8,672,334 B1* | 3/2014 | Murakami | B60G 17/016 280/5.514 |
| 8,844,944 B1* | 9/2014 | Murakami | B62K 25/00 280/5.514 |
| 9,004,500 B2* | 4/2015 | Murakami | B60G 17/0272 280/5.514 |
| 9,115,734 B2* | 8/2015 | Murakami | B60G 17/08 |
| 10,336,317 B2* | 7/2019 | Fahland | B62D 35/00 |
| 10,358,182 B2* | 7/2019 | Murakami | B60G 17/044 |
| 10,457,109 B2* | 10/2019 | Murakami | B60G 17/0155 |
| 2014/0083093 A1* | 3/2014 | Murakami | B62K 25/02 60/459 |

(Continued)

FOREIGN PATENT DOCUMENTS

| DE | 3872530 T2 | 2/1993 |
|---|---|---|
| DE | 102011100387 A1 | 11/2012 |

(Continued)

OTHER PUBLICATIONS

German Office Action dated Nov. 21, 2022 for the corresponding German Patent Application No. 112020003925.0 (7 pages including English translation).

(Continued)

*Primary Examiner* — Long T Tran

(74) *Attorney, Agent, or Firm* — Leason Ellis LLP; Edward J. Ellis; Melvin C. Garner

(57) ABSTRACT

A processing device is configured to perform a process of bringing a response speed of a first sensor close to a response speed of a second sensor when a value using a detection value of the first sensor is extracted at a timing determined by using an output value of the second sensor having a response speed different from that of the first sensor.

14 Claims, 9 Drawing Sheets

(56) References Cited

U.S. PATENT DOCUMENTS

| | | | | |
|---|---|---|---|---|
| 2014/0084555 A1* | 3/2014 | Murakami | ............ | B62K 25/00 |
| | | | | 280/5.514 |
| 2016/0121924 A1* | 5/2016 | Norstad | ................ | B60W 10/06 |
| | | | | 701/41 |
| 2017/0136842 A1* | 5/2017 | Anderson | ............ | B60G 99/002 |
| 2018/0162186 A1* | 6/2018 | Anderson | ............ | B60G 17/016 |
| 2019/0001776 A1 | 1/2019 | Murakami et al. | | |
| 2020/0062070 A1 | 2/2020 | Fukazawa et al. | | |

FOREIGN PATENT DOCUMENTS

| | | |
|---|---|---|
| DE | 102012019619 A1 | 4/2014 |
| JP | 02162110 A | 6/1990 |
| JP | 02204114 A | 8/1990 |
| JP | 05004507 A | 1/1993 |
| JP | 2001263153 A | 9/2001 |
| JP | 2018144650 A | 9/2018 |
| WO | 2019008777 A1 | 1/2019 |

OTHER PUBLICATIONS

International Search Report dated Apr. 21, 2020 for the corresponding International Patent Application No. PCT/JP2020/005288, 6 pages [English translation attached].

\* cited by examiner

PROCESSING DEVICE, VEHICLE HEIGHT ADJUSTMENT DEVICE, AND SADDLE-TYPE VEHICLE

CROSS-REFERENCE TO RELATED ART APPLICATION(S)

This application is a Continuation of International Application No. PCT/JP2020/005288 filed on Feb. 12, 2020, the content of which is incorporated herein by reference in its entirety.

FIELD OF THE INVENTION

The present invention relates to a processing device, a vehicle height adjustment device, and a saddle-type vehicle.

BACKGROUND OF THE INVENTION

In recent years, a device which adjusts a height (vehicle height) of a vehicle main body of a vehicle has been proposed in order to facilitate getting on and off and adjust a posture.

For example, a front fork, a rear suspension, and a control device described in JP-A-2018-144650 are an example of a vehicle height adjustment device which adjusts a vehicle height of a motorcycle. In a vehicle height adjustment device described in JP-A-2018-144650, a vehicle height is adjusted by using a variation amount of an entire length of the rear suspension detected by a rear wheel-side length variation amount detection unit exemplified by a stroke sensor.

When a vehicle height is adjusted using an output value of a stroke sensor, it is desirable to use an output value of a stroke sensor when a vehicle is in a traveling state appropriate for detecting a vehicle height. This is because, for example, an output value of a stroke sensor when the vehicle is traveling on a road having a large unevenness is a value which follows the unevenness of the road, and there is a possibility that a vehicle height cannot be detected with high accuracy. Therefore, it is conceivable to determine a timing of extracting the output value of the stroke sensor used to ascertain the vehicle height by using an output value of another sensor such as an acceleration sensor which detects an acceleration, for example.

Here, output values of the stroke sensor and the acceleration sensor are values passing through a filter such as a low-pass filter provided to smooth detection values in time series. While a response speed increases as a time constant decreases, the low-pass filter is easily affected by noise. While the response speed decreases as the time constant increases, the low-pass filter is less likely to be affected by noise. Therefore, the response speed (time constant) of the low-pass filter is determined for each sensor according to a target to be detected.

Therefore, for example, in a case where the timing for extracting the output value of the stroke sensor is determined by using the output value of the acceleration sensor, when the timing for extracting an output value of another sensor is determined by using an output value of one sensor among a plurality of sensors having different response speeds, a temporal phase difference may occur. When the temporal phase difference is large, detection accuracy of a sensor may deteriorate.

SUMMARY OF THE INVENTION

An object of the present invention is to provide a processing device or the like which can improve detection accuracy of a sensor even when the plurality of sensors having different response speeds are used.

Hereinafter, the present disclosure will be described.

An aspect of the present disclosure is a processing device which performs a process of bringing a response speed of a first sensor close to a response speed of a second sensor when a value using a detection value of the first sensor is extracted at a timing determined by using an output value of the second sensor having a response speed different from that of the first sensor.

Here, response speeds may be made close to each other by using a filter.

The response speed of the first sensor may be higher than the response speed of the second sensor.

The first sensor may be a stroke sensor which detects a stroke amount of a suspension device.

The second sensor may be at least one of an acceleration sensor which detects an acceleration of a vehicle main body and an angular velocity sensor which detects an angular velocity of the vehicle main body.

Another aspect of the present disclosure is a vehicle height adjustment device including the processing device according to the aspect described above and an adjustment unit configured to adjust a height of the vehicle main body.

Here, in a case where values extracted from a plurality of values using the detection value of the first sensor are set as extraction values, when an absolute value of a deviation between an average value of the plurality of extraction values and a target amount is equal to or greater than a predetermined reference value, control may be performed to bring the average value close to the target amount.

When the average value is continuously calculated and the absolute value of the deviation between the average value and the target amount is continuously equal to or greater than the reference value, control may be performed to bring the average value close to the target amount.

When the average value is calculated a plurality of times and the absolute value of the deviation between the average value and the target amount is equal to or greater than a reference value a plurality of times within a predetermined period, control may be performed to bring the average value close to the target amount.

Another aspect of the present disclosure is a saddle-type vehicle including the vehicle height adjustment device according to the aspect described above.

According to the present invention, it is possible to provide a processing device or the like which can improve detection accuracy of a sensor even when the plurality of sensors having different response speeds are used.

DETAILED DESCRIPTION OF THE INVENTION

Hereinafter, embodiments of the present invention will be described in detail with reference to the accompanying drawings. The following embodiments are examples of the embodiments of the present invention, and the present invention is not limited to the following embodiments.

First Embodiment

Figure 1:
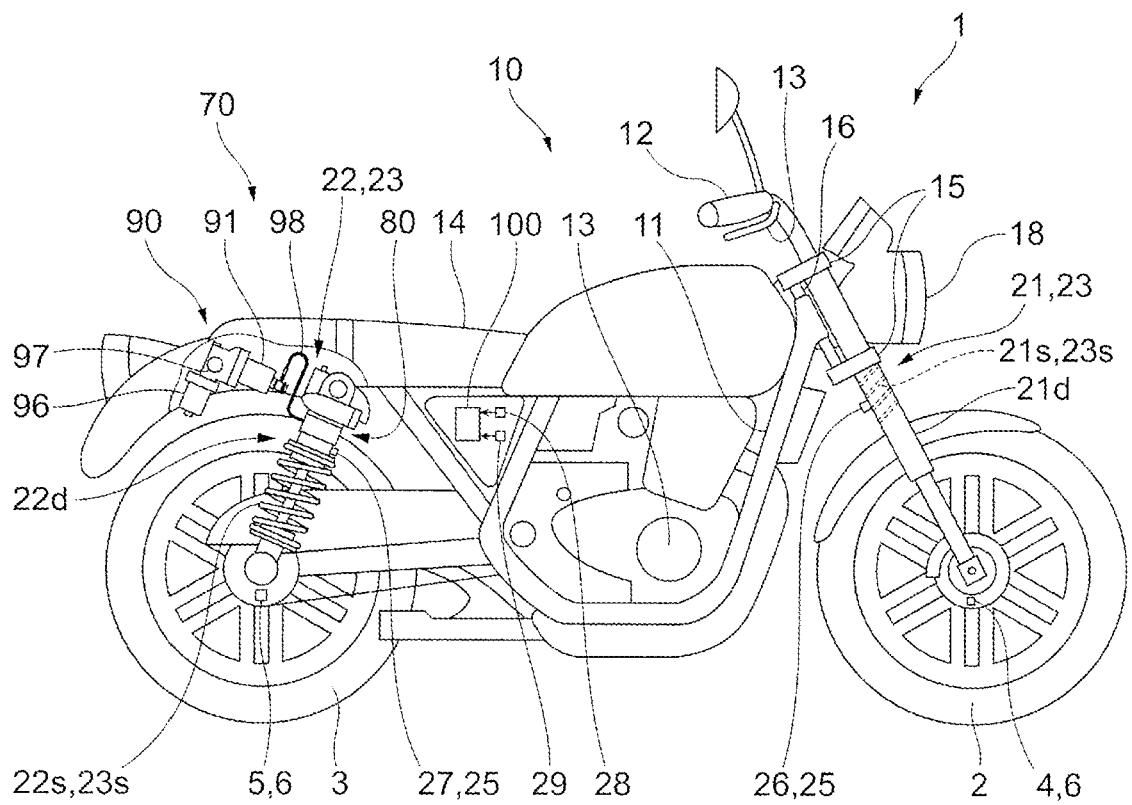
FIG. 1 is a diagram illustrating an example of a schematic configuration of a motorcycle 1 according to a first embodiment.

FIG. 1 is a diagram illustrating an example of a schematic configuration of a motorcycle 1 according to a first embodiment.

Figure 2:
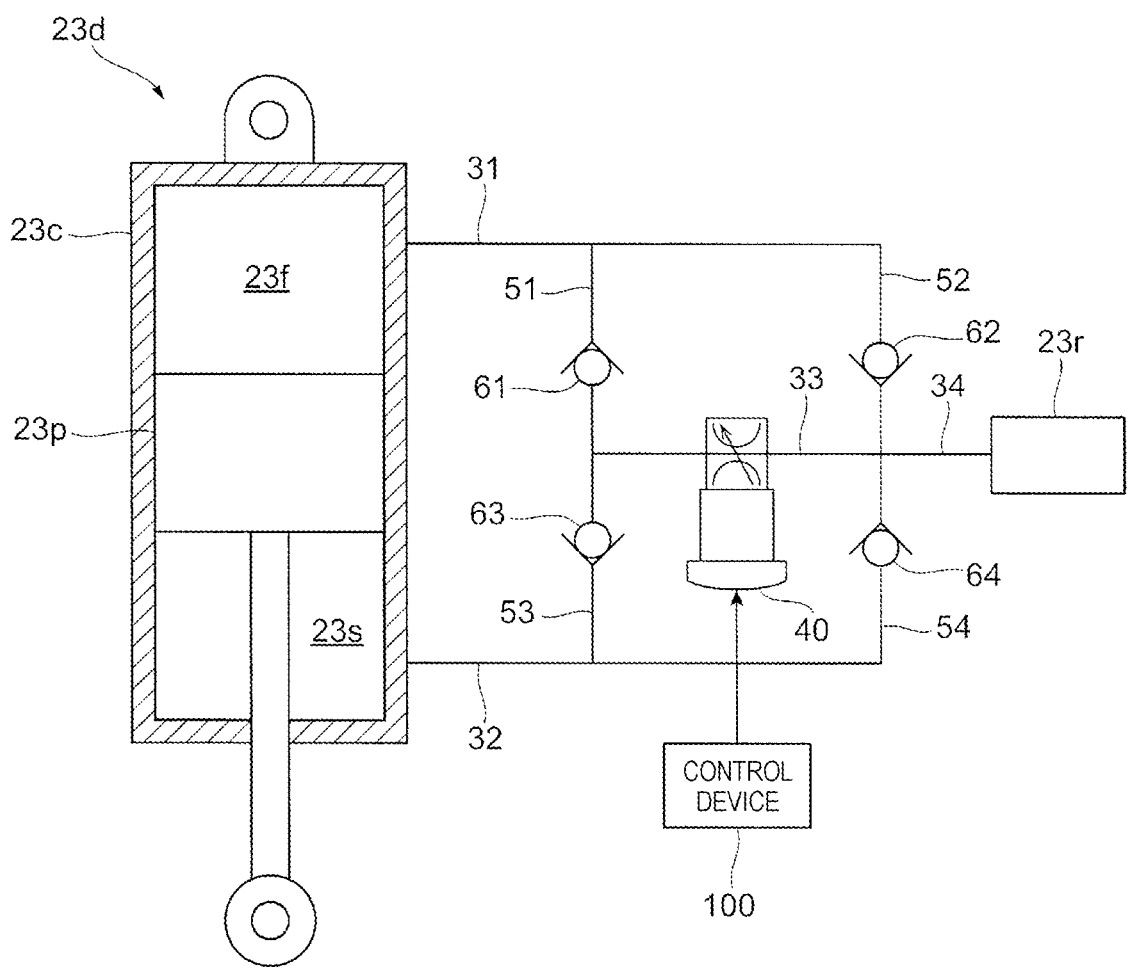
FIG. 2 is a diagram illustrating an example of a schematic configuration of a damping device 23d.

FIG. 2 is a diagram illustrating an example of a schematic configuration of a damping device 23d.

Figure 3:
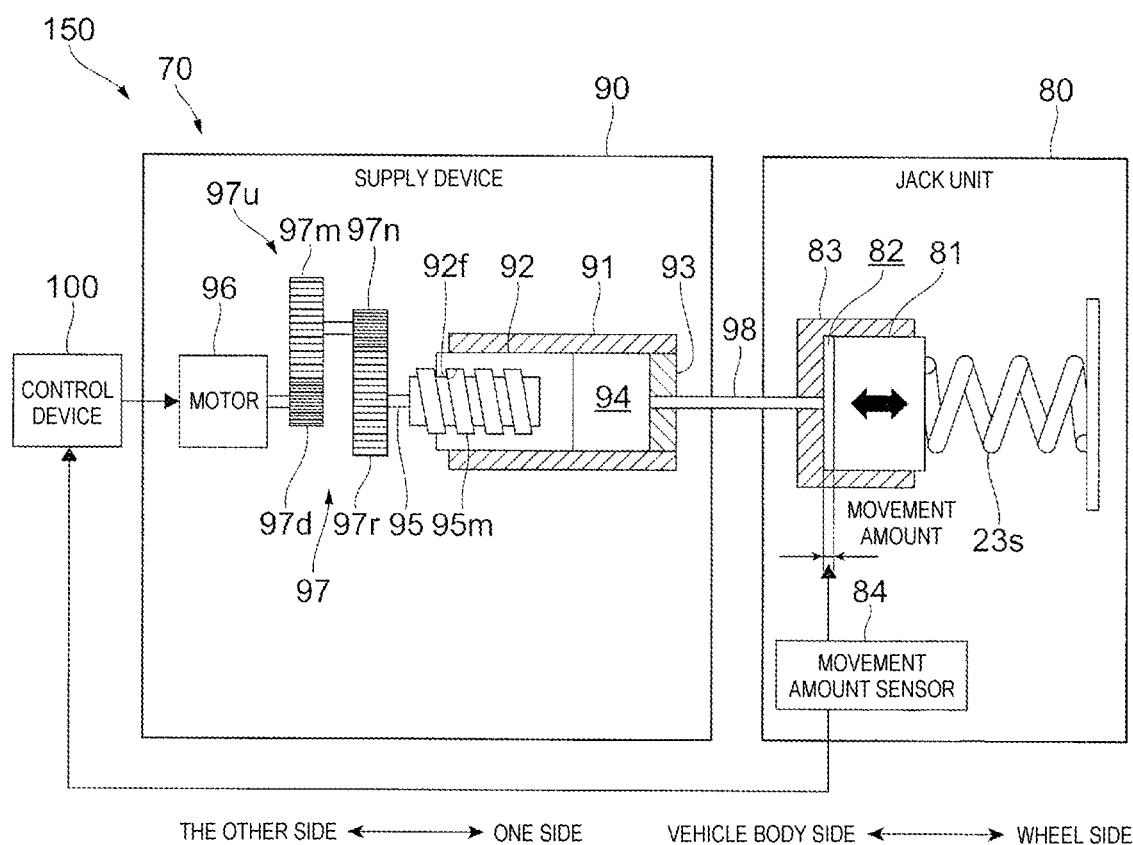
FIG. 3 is a diagram illustrating an example of a schematic configuration of a vehicle height adjustment device 150.

FIG. 3 is a diagram illustrating an example of a schematic configuration of a vehicle height adjustment device 150.

The motorcycle 1 as an example of a saddle-type vehicle includes a front wheel 2 which is a wheel on a front side, a rear wheel 3 which is a wheel on a rear side, a wheel speed sensor 4 which detects a rotation speed of the front wheel 2, and a wheel speed sensor 5 which detects a rotation speed of the rear wheel 3.

The motorcycle 1 further includes a vehicle main body 10 as an example of a vehicle main body having a vehicle body frame 11 forming a framework of the motorcycle 1, a handle 12, a brake lever 13, and a seat 14.

In the following description, the front wheel 2 and the rear wheel 3 may be collectively referred to as a "wheel", and the vehicle main body 10 may be referred to as a "vehicle body". The wheel speed sensor 4 and the wheel speed sensor 5 may be collectively referred to as a "wheel speed sensor 6".

The motorcycle 1 includes a front fork 21 as an example of a suspension device which couples the front wheel 2 and the vehicle main body 10. The motorcycle 1 also includes two brackets 15 which hold two front forks 21 disposed on the left and right of the front wheel 2, and a shaft 16 disposed between the two brackets 15. The shaft 16 is rotatably supported by the vehicle body frame 11. The front fork 21 includes a suspension spring 21s which absorbs an impact applied to the front wheel 2 from a road surface or the like, and a damping device 21d which damps vibration of the suspension spring 21s.

The motorcycle 1 further includes a rear suspension 22 as an example of a suspension device which couples the rear wheel 3 and the vehicle main body 10, at each of a left side and a right side of the rear wheel 3. The rear suspension 22 includes a suspension spring 22s which absorbs an impact applied to the rear wheel 3 from a road surface or the like, and a damping device 22d which damps vibration of the suspension spring 22s.

In the following description, the front fork 21 and the rear suspension 22 may be collectively referred to as a "suspension device 23". The suspension spring 21s and the suspension spring 22s may be collectively referred to as a "spring 23s". The damping device 21d and the damping device 22d may be collectively referred to as a "damping device 23d".

The motorcycle 1 further includes a stroke sensor 26 which detects a stroke amount of the front fork 21 and a stroke sensor 27 which detects a stroke amount of the rear suspension 22. The stroke amount may be, for example, a displacement amount from when the front fork 21 and the rear suspension 22 are in a most contracted state. In the following description, the stroke sensor 26 and the stroke sensor 27 may be collectively referred to as a "stroke sensor 25".

The motorcycle 1 further includes an acceleration sensor 28 which detects an acceleration in each of a front-rear direction, a left-right direction, and an up-down direction of the vehicle main body 10.

The motorcycle 1 further includes an angular velocity sensor 29 which detects an angular velocity about each of a pitch axis, a roll axis, and a yaw axis passing through a center of gravity of the vehicle main body 10.

Here, each of the stroke sensor 25, the acceleration sensor 28, and the angular velocity sensor 29 outputs a value passing through a low-pass filter which smoothes detection values in time series. A time constant of the low-pass filter of the stroke sensor 25 is smaller than time constants of low-pass filters of the acceleration sensor 28 and the angular velocity sensor 29. This is to suppress an increase in a deviation between an actual stroke amount and an output value of the stroke sensor 25 because wheels frequently fluctuate up and down due to unevenness of a road or the like. On the other hand, for example, vertical fluctuation of the wheels due to unevenness of the road or the like is transmitted to the acceleration sensor 28 and the angular velocity sensor 29 via the suspension device 23. Therefore, a deviation between an actual acceleration and an output value of the acceleration sensor 28 and a deviation between an actual angular velocity and an output value of the angular velocity sensor 29 is not as large as the deviation between the actual stroke amount and the output value of the stroke sensor 25. Therefore, a response speed of the stroke sensor 25 is higher than response speeds of the acceleration sensor 28 and the angular velocity sensor 29.

The motorcycle 1 includes an adjustment unit 70 as an example of an adjustment unit which adjusts a height of the vehicle main body 10, in other words, a vehicle height, by changing an initial load (preload) applied to the spring 23s.

The motorcycle 1 includes a processing device 100 (hereinafter, the processing device 100 may be referred to as a "control device 100") which controls a damping force of the damping device 23d and the initial load of the spring 23s.

(Damping Device 23d)

As illustrated in FIG. 2, since a piston 23p is accommodated in a cylinder 23c, the damping device 23d includes, in the cylinder 23c, an oil chamber 23f in which a pressure is increased when the suspension device 23 is compressed, and an oil chamber 23s in which a pressure is increased when the suspension device 23 is extended.

The damping device 23d includes a first oil passage 31 connected to the oil chamber 23f and a second oil passage 32 connected to the oil chamber 23s. The damping device 23d includes a third oil passage 33 provided between the first oil passage 31 and the second oil passage 32, and a control valve 40 provided in the third oil passage 33. The damping device 23d includes a first branch passage 51 which connects the first oil passage 31 and one end portion of the third oil passage 33, and a second branch passage 52 which connects the first oil passage 31 and the other end portion of the third oil passage 33. The damping device 23d includes a third branch passage 53 which connects the second oil passage 32 and one end portion of the third oil passage 33, and a fourth branch passage 54 which connects the second oil passage 32 and the other end portion of the third oil passage 33.

The damping device 23d includes a first check valve 61 which is provided in the first branch passage 51, allows oil to move from the first oil passage 31 toward the third oil passage 33, and prohibits the oil from moving from the third oil passage 33 toward the first oil passage 31. The damping device 23d includes a second check valve 62 which is provided in the second branch passage 52, allows the oil to move from the third oil passage 33 toward the first oil passage 31, and prohibits the oil from moving from the first oil passage 31 toward the third oil passage 33.

The damping device 23d includes a third check valve 63 which is provided in the third branch passage 53, allows the oil to move from the second oil passage 32 toward the third oil passage 33, and prohibits the oil from moving from the third oil passage 33 toward the second oil passage 32. The damping device 23d includes a fourth check valve 64 which is provided in the fourth branch passage 54, allows the oil to move from the third oil passage 33 toward the second oil passage 32, and prohibits the oil from moving from the second oil passage 32 toward the third oil passage 33.

The damping device 23d includes a reservoir chamber 23r which stores the oil and has a function of supplying and discharging the oil, and a reservoir passage 34 which connects the reservoir chamber 23r and the other end portion of the third oil passage 33.

The control valve 40 has a solenoid, and can control a pressure of oil passing through the valve by controlling an amount of current supplied to the solenoid. The control valve 40 increases the pressure of the oil passing through the valve as the amount of current supplied to the solenoid increases. The amount of current supplied to the solenoid is controlled by the control device 100.

When the piston 23p moves toward the oil chamber 23f, an oil pressure in the oil chamber 23f increases. Then, oil in the oil chamber 23f flows toward the control valve 40 via the first oil passage 31 and the first branch passage 51. The pressure of the oil passing through the control valve 40 is adjusted by a valve pressure of the control valve 40, so that a damping force on a compression side is adjusted. The oil passing through the control valve 40 flows into the oil chamber 23s via the fourth branch passage 54 and the second oil passage 32.

On the other hand, when the piston 23p moves toward the oil chamber 23s, an oil pressure in the oil chamber 23s increases. Then, oil in the oil chamber 23s flows toward the control valve 40 via the second oil passage 32 and the third branch passage 53. The pressure of the oil passing through the control valve 40 is adjusted by the valve pressure of the control valve 40, so that the damping force on an extension side is adjusted. The oil passing through the control valve 40 flows into the oil chamber 23f via the second branch passage 52 and the first oil passage 31.

(Adjustment Unit 70)

The adjustment unit 70 includes a jack unit 80 which is provided on the suspension device 23 and adjusts a length of the spring 23s, and a supply device 90 which supplies oil to a jack chamber 82 of a jack unit 80.

As illustrated in FIG. 3, the jack unit 80 includes a support member 81 which supports an end portion of the spring 23s on a vehicle body side, and a forming member 83 which forms a jack chamber 82 together with the support member 81, and adjusts the length of the spring 23s by moving the support member 81 according to the amount of oil in the jack chamber 82. The support member 81, the jack chamber 82, and the forming member 83 may be realized by, for example, a support member, a jack chamber, and a hydraulic jack of a rear suspension or a front fork described in JP-A-2018-144650, respectively.

The jack unit 80 includes a movement amount sensor 84 which detects a movement amount of the support member 81. The movement amount of the support member 81 detected by the movement amount sensor 84 is a movement amount when a movement amount when the support member 81 is located at a reference position is set to 0. The reference position is a position of the support member 81 when oil in the jack chamber 82 is 0. The movement amount sensor 84 may be, for example, a sensor which winds a coil around an outer peripheral surface of the forming member 83, uses the support member 81 as a magnetic body, and detects the movement amount of the support member 81 by using impedance of the coil which changes in accordance with movement of the support member 81 with respect to the forming member 83.

As illustrated in FIG. 3, the supply device 90 includes a tubular cylinder 91, a cylindrical piston 92 which slides in the cylinder 91, and a disc-shaped lid 93 which closes an end portion on one side (right side in FIG. 2) of the cylinder 91. A storage chamber 94 for storing oil is formed in a space surrounded by the cylinder 91, the piston 92, and the lid 93. The piston 92 is formed with a cylindrical recess recessed from an end surface on the other side (left side in FIG. 2), and a female screw 92f is formed in the recess.

As illustrated in FIG. 3, the supply device 90 includes a screw member 95 formed with a male screw 95m which meshes with the female screw 92f formed in the piston 92. The supply device 90 includes a motor 96 which rotates the screw member 95, and a speed reducer 97 which transmits a driving force of the motor 96 to the screw member 95 by reducing a rotation speed.

The motor 96 may be, for example, a direct-current (DC) motor with a brush. Driving of the motor 96 is controlled by the control device 100. As illustrated in FIG. 3, the speed reducer 97 includes a drive gear 97d mounted on an output shaft of the motor 96, a driven gear 97r mounted on the screw member 95, and a gear unit 97u having a first intermediate gear 97m meshing with the drive gear 97d and a second intermediate gear 97n meshing with the driven gear 97r.

The supply device 90 includes a hose 98 which is provided between the storage chamber 94 and the jack chamber 82 of the jack unit 80 and allows oil to flow between the storage chamber 94 and the jack chamber 82.

In the adjustment unit 70, the motor 96 of the supply device 90 rotates in one direction, so that the piston 92 discharges the oil from the storage chamber 94. Accordingly, the oil is supplied into the jack chamber 82 via the hose 98. The support member 81 moves to a wheel side (right side in FIG. 3) with respect to the forming member 83, in other words, a movement amount of the support member 81 from the reference position increases, and a spring length of the spring 23s decreases.

When the spring length of the spring 23s decreases, a spring force of the spring 23s pressing the support member 81 is larger than that before the support member 81 moves with respect to the forming member 83. As a result, even if a force acts from the vehicle body toward the wheel side, the initial load which does not change a relative position between the vehicle body and the wheel side increases. In such a case, when the same force acts on the wheel side from the vehicle body side, a sinking amount of the suspension device 23 (change in a distance between the vehicle body and the wheel) decreases. Therefore, when the spring length of the spring 23s decreases by moving the support member 81 with respect to the forming member 83, the height of the vehicle main body 10 increases (the vehicle height increases) as compared with a height before the support member 81 moves with respect to the forming member 83.

On the other hand, when the motor 96 of the supply device 90 rotates in the other direction, a volume of the storage chamber 94 increases. Then, the support member 81 discharges the oil in the jack chamber 82 and supplies the oil to the storage chamber 94. Accordingly, the support member 81 moves to the vehicle body side (left side in FIG. 3) with respect to the forming member 83, in other words, the movement amount of the support member 81 from the reference position decreases, and the spring length of the spring 23s increases.

When the spring length of the spring 23s increases, the spring force of the spring 23s pressing the support member 81 is smaller than that before the support member 81 moves with respect to the forming member 83. As a result, when the same force acts on the wheel side from the vehicle body side, the sinking amount of the suspension device 23 increases. Therefore, when the spring length of the spring 23s increases by moving the support member 81 with respect to the forming member 83, the height of the vehicle main body 10 decreases (the vehicle height decreases) as compared with the height before the support member 81 moves with respect to the forming member 83.

The adjustment unit 70 configured as described above, the control device 100, and the like constitute a vehicle height adjustment device 150 which adjusts the vehicle height of the motorcycle 1.

(Control Device 100)

Figure 4:
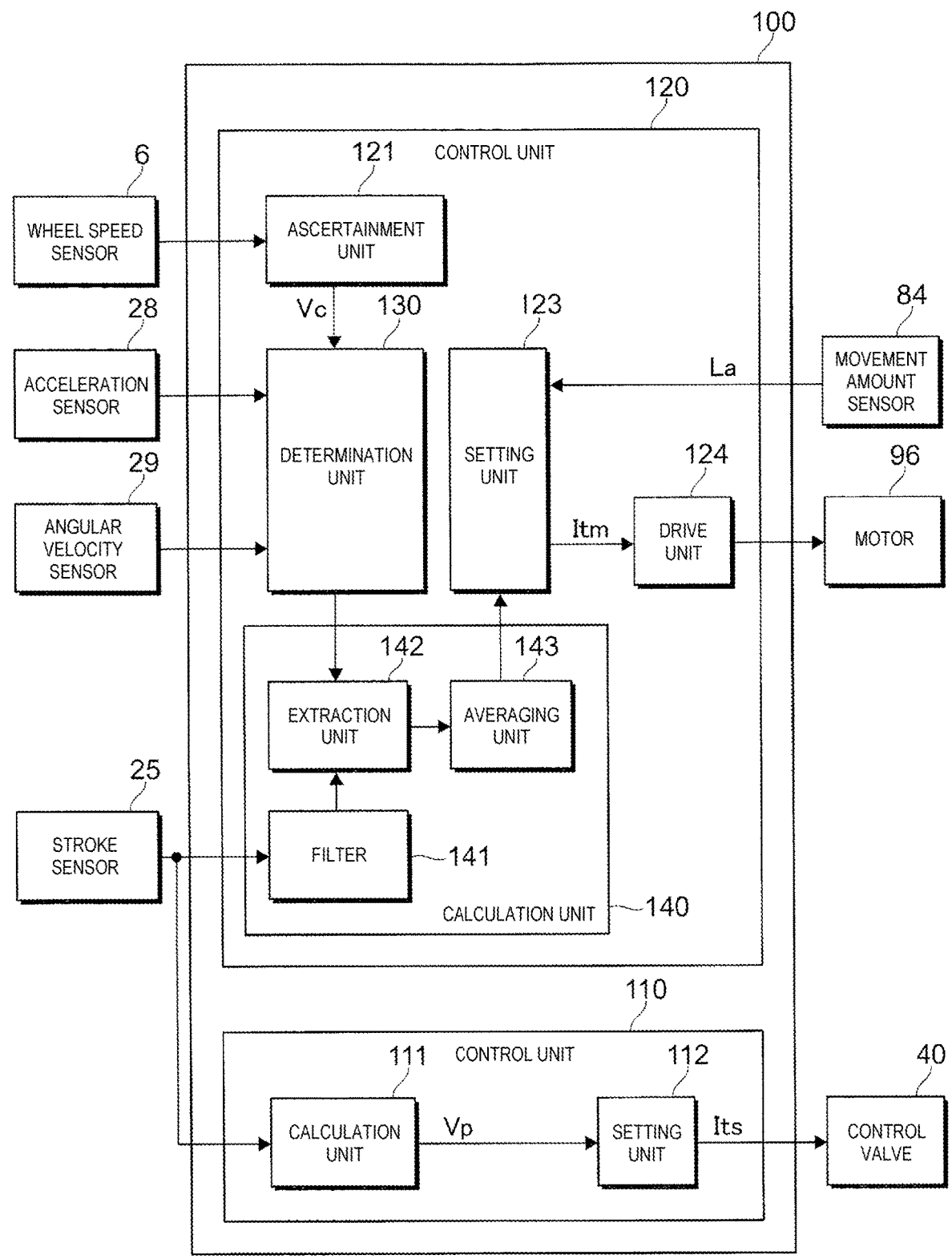
FIG. 4 is a diagram illustrating an example of a block diagram of a processing device 100.

FIG. 4 is a diagram illustrating an example of a block diagram of the control device 100.

The control device 100 includes a CPU, a ROM in which a program executed by the CPU, various data, and the like are stored, a RAM used as a working memory or the like of the CPU, and an EEPROM which is a nonvolatile memory.

Output signals from the wheel speed sensor 6, the stroke sensor 25, the acceleration sensor 28, the angular velocity sensor 29, the movement amount sensor 84, and the like are input to the control device 100.

The control device 100 includes a control unit 110 which controls the damping force of the damping device 23d, and a control unit 120 which controls the initial load of the spring 23s. The control unit 110 and the control unit 120 are implemented by the CPU executing software stored in a storage area such as a ROM.

The control unit 110 includes a calculation unit 111 which calculates a change amount of the stroke amount per unit time, in other words, a speed Vp which is a speed of change in the stroke amount. The calculation unit 111 calculates the speed Vp by differentiating the output value of the stroke sensor 25.

The control unit 110 includes a setting unit 112 which sets a target current Its supplied to the solenoid of the control valve 40 and controls the current supplied to the solenoid to be the target current Its. The setting unit 112 includes, for example, a transistor (Field Effect Transistor: FET) as a switching element connected between a positive electrode side line of a power supply and a coil of the solenoid of the control valve 40. The setting unit 112 switches the transistor so that the current supplied to the control valve 40 is the target current Its.

The setting unit 112 sets the target current Its using the speed Vp calculated by the calculation unit 111. For example, the setting unit 112 calculates the target current Its by substituting the speed Vp into a control map which is created in advance based on a rule of thumb and recorded in the ROM and which indicates a relation between the target current Its and the speed Vp.

The control unit 120 includes a setting unit 123 which sets a target current Itm supplied to the motor 96, and a drive unit 124 which controls driving of the motor 96.

The drive unit 124 includes, for example, a transistor (FET) as a switching element connected between a positive electrode side line of a power supply and a coil of the motor 96. The drive unit 124 controls the driving of the motor 96 by driving a gate of the transistor and switching the transistor.

The setting unit 123 moves the piston 92 so that a target value Lt of the movement amount of the support member 81 of the jack unit 80 matches a detection value La ascertained using the output value of the movement amount sensor 84. The target value Lt may be, for example, a value corresponding to a target vehicle height selected by a user via a user interface provided in the motorcycle 1.

When the piston 92 is moved in a direction in which the oil is discharged from the storage chamber 94, the setting unit 123 sets the target current Itm to a predetermined increase value. On the other hand, when the piston 92 is moved in a direction in which the oil is discharged from the jack chamber 82, the setting unit 123 sets the target current Itm to a predetermined decrease value. When a current in a direction in which the motor 96 is rotated so as to move the piston 92 to discharge the oil from the storage chamber 94 is positive and a current in a direction in which the motor 96 is rotated so as to move the piston 92 to discharge the oil from the jack chamber 82 is negative, the increase value may be 8A, and the decrease value may be −8A.

When determining a movement direction of the piston 92, the setting unit 123 first determines whether a subtraction value $\Delta L$ (=Lt−La) obtained by subtracting the detection value La ascertained using the output value of the movement amount sensor 84 from the target value Lt is larger than 0. When the subtraction value $\Delta L$ is larger than 0 ($\Delta L>0$), the setting unit 123 sets the target current Itm to an increase value in order to move the piston 92 in the direction in which the oil is discharged from the storage chamber 94. On the other hand, when the subtraction value $\Delta L$ is smaller than 0 ($\Delta L<0$), the setting unit 123 sets the target current Itm to a decrease value in order to move the piston 92 in the direction in which the oil is discharged from the jack chamber 82. Further, when the subtraction value $\Delta L$ is 0 ($\Delta L=0$), the setting unit 123 sets the target current Itm to 0.

The setting unit 123 may determine whether an absolute value of the subtraction value $\Delta L$ is larger than a predetermined reference deviation, may set the target current Itm to 0A when the absolute value of the subtraction value $\Delta L$ is equal to or smaller than the reference deviation, and may set the target current Itm to an increase value or a decrease value according to a sign of the subtraction value $\Delta L$ when the absolute value of the subtraction value $\Delta L$ is larger than the reference deviation.

(Correction)

The above is the basic control performed by the setting unit 123, but, for example, in a case of a two-seater motorcycle, in a case of loading a cargo on the motorcycle 1, or the like, the suspension device 23 may not reach a target length and the vehicle height may not reach a target height even though the movement amount of the support member 81 is the target value Lt. Therefore, the control unit 120 determines whether the suspension device 23 has a target length. When the suspension device 23 has no target length, the control unit 120 performs correction control for correcting the movement amount of the support member 81 to acquire the target length. More specifically, after the movement amount of the support member 81 reaches the target value Lt, the control unit 120 determines whether a length of the suspension device 23 during normal traveling is the target length, and corrects the movement amount of the support member 81 when the length of the suspension device 23 during normal traveling is not the target length.

The control unit 120 uses a detection value of the stroke sensor 25 when determining whether the length of the suspension device 23 is the target length. Further, in order to ascertain the length of the suspension device 23 with high accuracy, a predetermined number of detection values of the stroke sensor 25 are extracted, and an average value of extracted values is used. A value during the normal traveling is used as a value used for calculating the average value. Here, the normal traveling means, for example, traveling at a predetermined vehicle speed or higher without accelerating or decelerating on a flat road with small unevenness. Reasons why the value during the normal traveling is used are as follows. For example, regarding an output value of the stroke sensor 25 when the motorcycle 1 is traveling on a road with large unevenness, since the spring 23s expands and contracts to follow the unevenness of the road, if the value when the motorcycle 1 is traveling on the road with large unevenness is used, the value may follow the unevenness. When the motorcycle 1 decelerates, pitching called nose dive occurs, and when the motorcycle 1 accelerates, pitching called squat occurs. Therefore, if an output value of the stroke sensor 25 when the motorcycle 1 accelerates or decelerates is used, the output value may be a value when pitching occurs. If an output value of the stroke sensor 25 when the motorcycle 1 is turning is used, the output value may be a value when rolling occurs.

In order to perform the correction control described above, the control unit 120 includes a determination unit 130 which determines whether a predetermined condition is satisfied, in other words, whether a vehicle is traveling normally, and a calculation unit 140 which calculates an average value using the extracted values when the determination unit 130 determines that the predetermined condition is satisfied. The control unit 120 includes an ascertainment unit 121 which ascertains a vehicle speed Vc, which is a movement speed of the motorcycle 1, by using at least one of the rotation speed of the front wheel 2 detected by the wheel speed sensor 4 and the rotation speed of the rear wheel 3 detected by the wheel speed sensor 5.

The determination unit 130 determines whether a predetermined condition is satisfied using the vehicle speed Vc ascertained by the ascertainment unit 121, the acceleration detected by the acceleration sensor 28, and the angular velocity detected by the angular velocity sensor 29. The predetermined condition may be, for example, that the vehicle speed Vc ascertained by the ascertainment unit 121 is equal to or higher than a predetermined vehicle speed, the absolute value of the acceleration detected by the acceleration sensor 28 is equal to or lower than a predetermined acceleration, and the absolute value of the angular velocity detected by the angular velocity sensor 29 is equal to or lower than a predetermined angular velocity. The predetermined vehicle speed may be 20 km, the predetermined acceleration may be 1 m/s$^2$, and the predetermined angular velocity may be 1 rad/s.

The calculation unit 140 includes a filter 141 as an example of a filter which smoothes output values of the stroke sensor 25, and an extraction unit 142 which extracts an output value of the filter 141. The calculation unit 140 includes an averaging unit 143 which calculates an average value of a plurality of output values of the filter 141 extracted by the extraction unit 142.

The filter 141 performs a filtering process of not attenuating a component having a frequency lower than a cutoff frequency but attenuating a component having a frequency higher than the cutoff frequency among the output values of the stroke sensor 25. That is, the filter 141 may be, for example, a low-pass filter. A time constant of the filter 141 is set to be larger than a time constant of the low-pass filter of the stroke sensor 25. Accordingly, the filter 141 performs a process of bringing the response speed of the stroke sensor 25 close to the response speeds of the acceleration sensor 28 and the angular velocity sensor 29.

When the determination unit 130 determines that the predetermined condition is satisfied, the extraction unit 142 extracts the output value of the filter 141 and stores the extracted output value (hereinafter, may be referred to as an "extraction value") in RAM.

Figure 5:
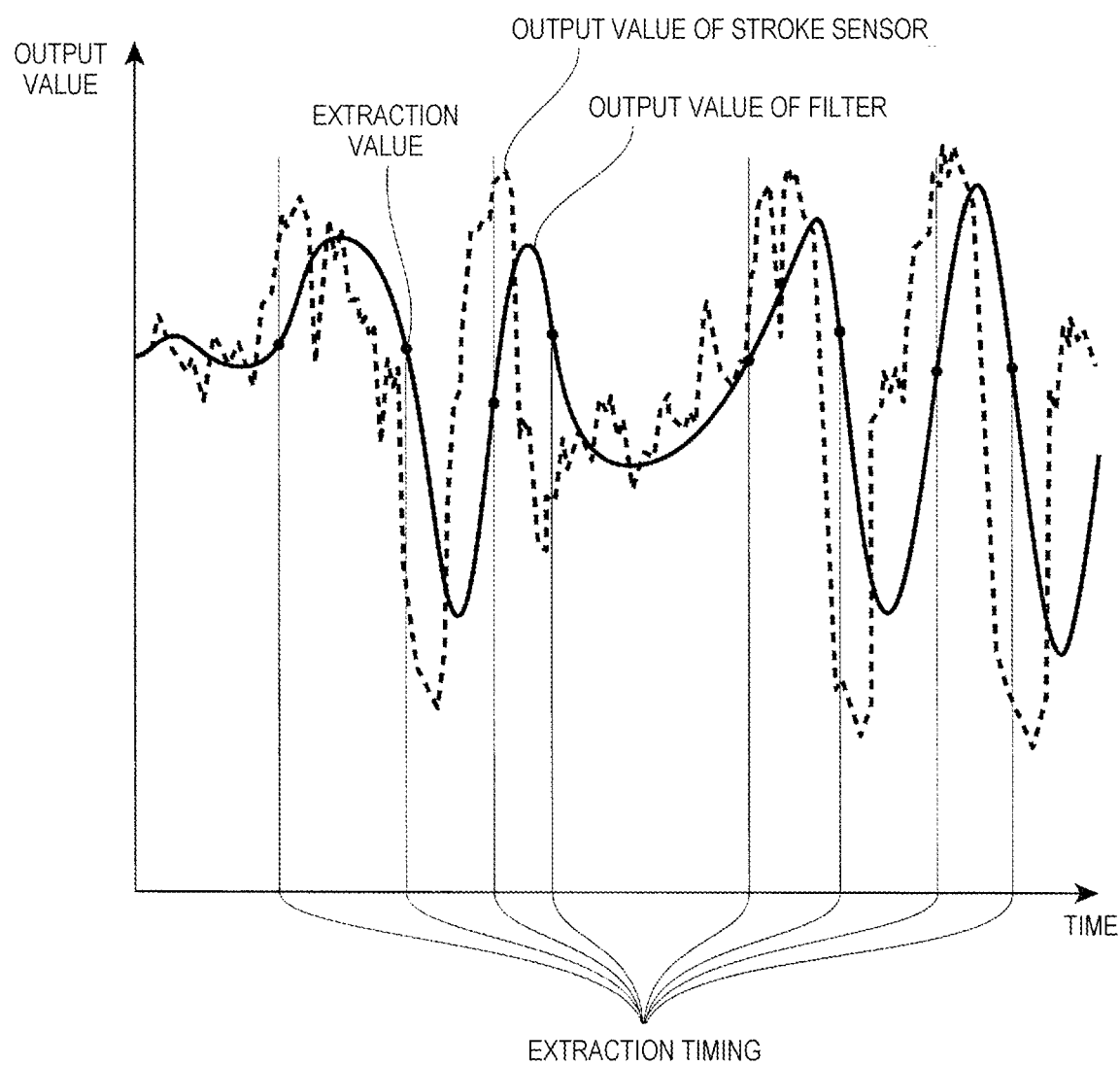
FIG. 5 is a diagram illustrating an example of a relation between an output value of a stroke sensor 25, an output value of a filter 141, and an extraction value.

FIG. 5 is a diagram illustrating an example of a relation between an output value of the stroke sensor 25, an output value of the filter 141, and an extraction value. In FIG. 5, a horizontal axis represents a time axis, a vertical axis represents the output value, the output value of the stroke sensor 25 is indicated by a broken line, and the output value of the filter 141 is indicated by a solid line. A black circle is an extraction value. At an extraction timing when the motorcycle 1 is in a traveling state satisfying the predetermined condition at the time of the black circle, the extraction unit 142 extracts the output values of the filter 141 to calculate the average value. As is clear from FIG. 5, a mutual variation of the extracted values is smaller when the output values of the filter 141 are extracted than when the output values of the stroke sensor 25 are extracted at the extraction timing.

The output value of the stroke sensor 25 is a value obtained by smoothing a detection value, which is a value obtained by detecting the stroke amount by the stroke sensor 25, by the low-pass filter included in the stroke sensor 25. Therefore, the output value of the stroke sensor 25 is a value using the detection value of the stroke sensor 25. The output value of the filter 141 is a value obtained by filtering the output value of the stroke sensor 25 by the filter 141. Therefore, the output value of the filter 141 is a value using the detection value of the stroke sensor 25.

When the number of extraction values extracted by the extraction unit 142 reaches a predetermined number, which is a predetermined plurality of values, the averaging unit 143 calculates an average value of the predetermined number of extraction values. The predetermined number may be, for example, 4000, which is a number corresponding to 4 seconds when a control cycle of the control unit 120 is 1 millisecond.

The setting unit 123 sets the target current Itm to correct the movement amount of the support member 81 by using the average value calculated by the calculation unit 140. More specifically, the setting unit 123 moves the piston 92 so that an averaged stroke amount (hereinafter, referred to as an "average amount") calculated by the calculation unit 140 matches a predetermined target stroke amount (hereinafter, referred to as a "target amount").

When determining the movement direction of the piston 92, the setting unit 123 first determines whether the absolute value of the subtraction amount (=target amount−average amount) obtained by subtracting the average amount from the target amount is larger than a predetermined reference value. When the absolute value of the subtraction amount is larger than the reference value and the subtraction amount is larger than 0, the setting unit 123 sets the target current Itm to an increase value in order to move the piston 92 in the direction in which the oil is discharged from the storage chamber 94. On the other hand, when the absolute value of the subtraction amount is larger than the reference value and the subtraction amount is smaller than 0, the setting unit 123 sets the target current Itm to a decrease value in order to move the piston 92 in the direction in which the oil is discharged from the jack chamber 82. Further, when the absolute value of the subtraction amount is smaller than the reference value, the setting unit 123 sets the target current Itm to 0.

Figure 6:
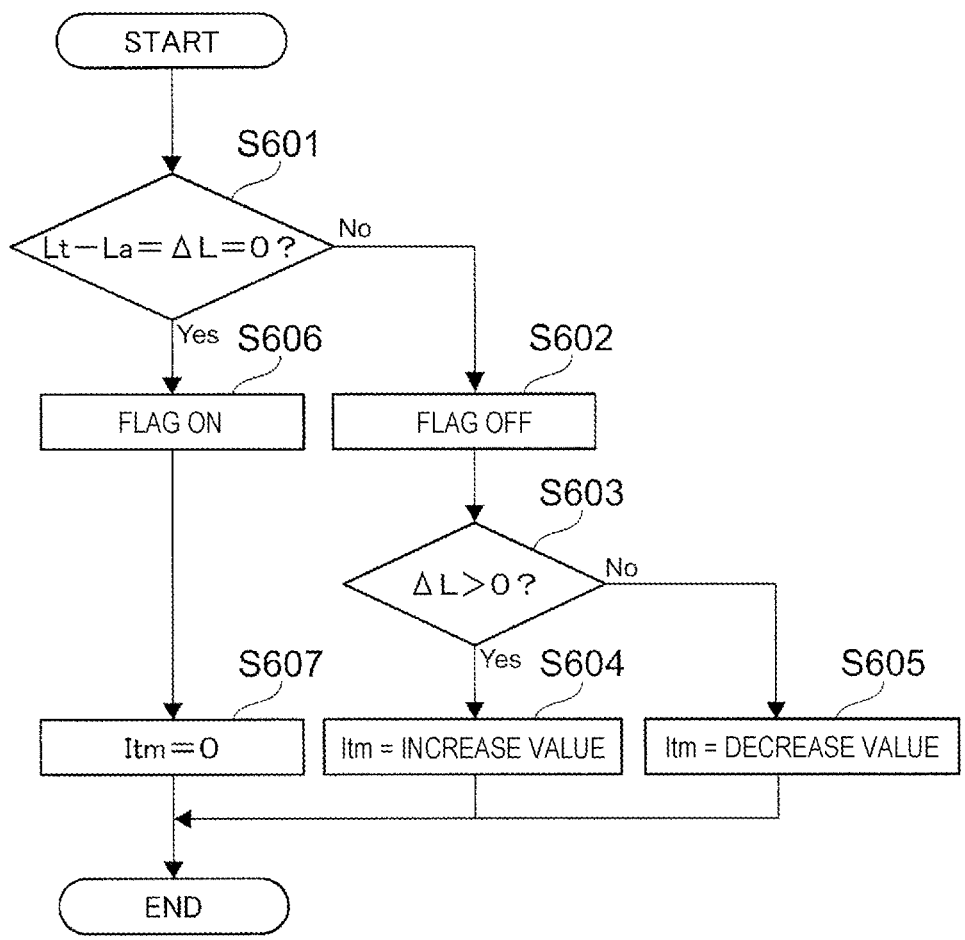
FIG. 6 is a flowchart illustrating an example of a procedure of a target current setting process performed by a setting unit 123.

FIG. 6 is a flowchart illustrating an example of a procedure of a target current setting process performed by the setting unit 123.

The setting unit 123 repeatedly executes this process, for example, every predetermined period (for example, 1 millisecond).

The setting unit 123 first determines whether the subtraction value ΔL (=Lt−La) is 0 (S601). When the subtraction value ΔL is not 0 (No in S601), the setting unit 123 sets a flag indicating that adjustment of the vehicle height is completed to OFF in a predetermined flag recording area provided in the RAM (S602), and determines whether the subtraction value ΔL is larger than 0 (S603). When the subtraction value ΔL is larger than 0 (Yes in S603), the setting unit 123 sets the target current Itm to an increase value in order to move the piston 92 in the direction in which the oil is discharged from the storage chamber 94 (S604). On the other hand, when the subtraction value ΔL is smaller than 0 (No in S603), the setting unit 123 sets the target current Itm to a decrease value in order to move the piston 92 in the direction in which the oil is discharged from the jack chamber 82 (S605).

Further, when the subtraction value ΔL is 0 (Yes in S601), the setting unit 123 sets the flag indicating that the adjustment of the vehicle height is completed (S606) to ON, and sets the target current Itm to 0 (S607).

Figure 7:
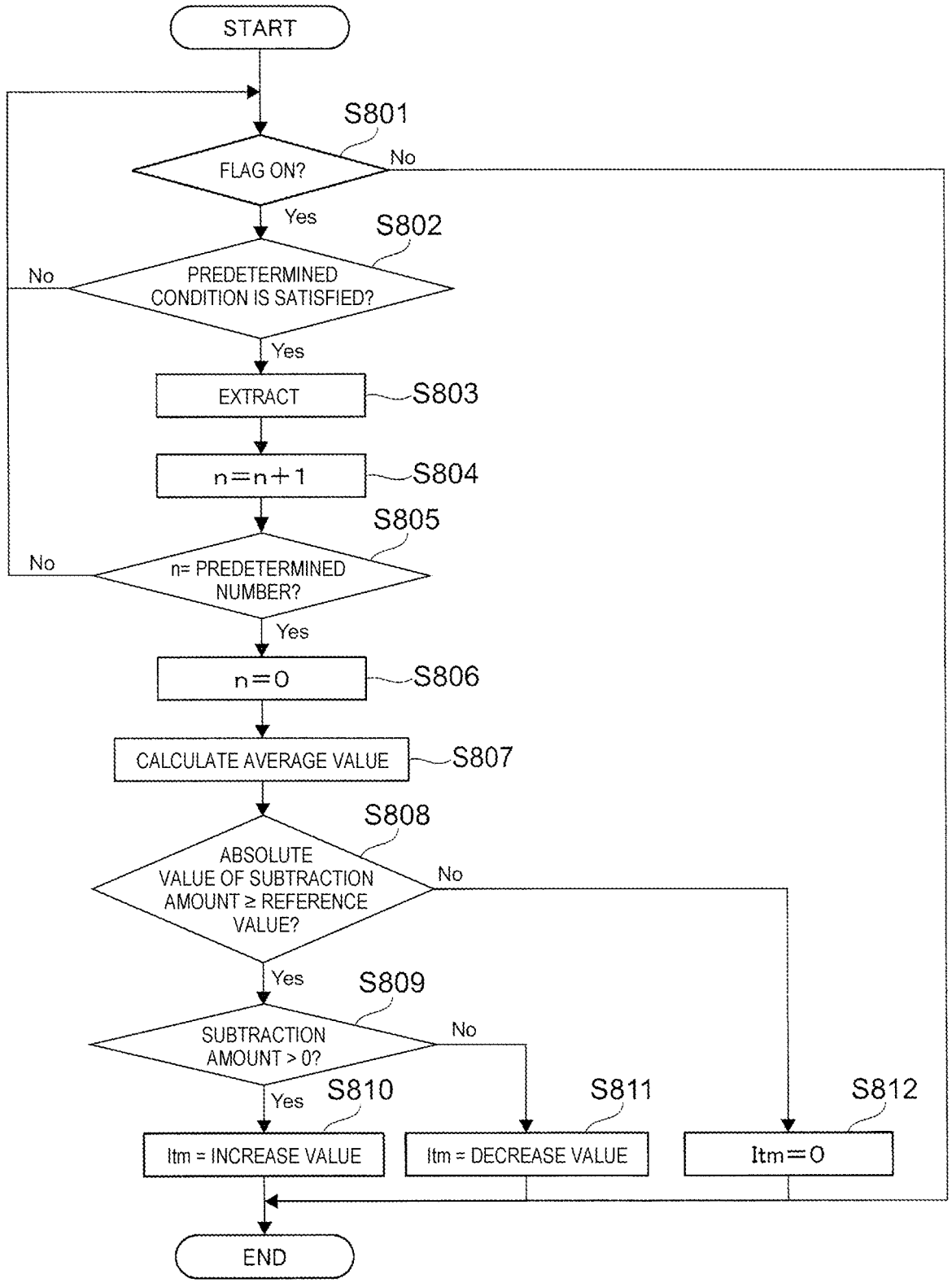
FIG. 7 is a flowchart illustrating an example of a procedure of a correction process according to the first embodiment performed by a control unit 120.

FIG. 7 is a flowchart illustrating an example of a procedure of a correction process according to the first embodiment performed by the control unit 120.

The control unit 120 repeatedly executes this process, for example, every predetermined period (for example, 1 millisecond).

First, the control unit 120 determines whether the flag is ON (S801). When the flag is ON (Yes in S801), the control unit 120 determines whether the predetermined condition is satisfied (S802). When the predetermined condition is satisfied (Yes in S802), the output value of the filter 141 is extracted and stored in the RAM (S803). Then, a count value n is incremented by 1 (S804). Processes of S801, S802, S803, and S804 are performed by the extraction unit 142. When the predetermined condition is not satisfied (No in S802), the control unit 120 performs processes after S801.

Thereafter, it is determined whether the count value n is a predetermined number (S805). When the count value n reaches the predetermined number (Yes in S805), the control unit 120 sets the count value n to 0 (S806) and calculates an average value (S807). Processes of S805, S806, and S807 are performed by the averaging unit 143. When the count value n does not reach the predetermined number (No in S805), the control unit 120 performs the processes after S801.

Thereafter, it is determined whether an absolute value of a subtraction amount (=target amount−average amount) obtained by subtracting the average value (average amount) calculated in S807 from the target amount is equal to or greater than the reference value (S808). When the absolute value of the subtraction amount is equal to or larger than the reference value (Yes in S808), it is determined whether the subtraction amount is larger than 0 (S809). When the subtraction amount is larger than 0 (Yes in S809), the control unit 120 sets the target current Itm to an increase value in order to move the piston 92 in the direction in which the oil is discharged from the storage chamber 94 (S810). On the other hand, when the subtraction amount is smaller than 0 (No in S809), the control unit 120 sets the target current Itm to a decrease value in order to move the piston 92 in the direction in which the oil is discharged from the jack chamber 82 (S811). Further, when the absolute value of the subtraction amount is smaller than the reference value (No in S808), the target current Itm is set to 0 (S812). Processes of S808, S809, S810, S811, and S812 are performed by the setting unit 123.

On the other hand, when the flag is not ON (No in S801), the control unit 120 ends the correction process. That is, when the control unit 120 controls the motor 96 so that the movement amount of the support member 81 is the target value Lt, the control unit 120 does not perform the correction control using the output value of the stroke sensor 25.

As described above, the control device 100 performs a process of bringing the response speed of the stroke sensor 25 close to the response speed of the acceleration sensor 28 when a value using the detection value of the stroke sensor 25 is extracted at a timing determined by using the output value of the acceleration sensor 28 as an example of a second sensor having a response speed different from that of the stroke sensor 25 as an example of a first sensor. That is, when the determination unit 130 determines that the predetermined condition is satisfied, the extraction unit 142 of the calculation unit 140 extracts a value (output value of the filter 141) obtained by smoothing the output value of the stroke sensor 25 by the filter 141. This point is different from the calculation unit 111 of the control unit 110 which calculates the velocity Vp by differentiating the output value of the stroke sensor 25. The time constant of the low-pass filter of the stroke sensor 25 is set to be smaller than the time constant of the low-pass filter of the acceleration sensor 28, and the time constant of the filter 141 is set to be larger than the time constant of the low-pass filter of the stroke sensor 25. Therefore, the filter 141 performs the process of bringing the response speed of the stroke sensor 25 close to the response speed of the acceleration sensor 28. Accordingly, even when the value using the detection value of the stroke sensor 25 is extracted at the timing determined by using the output value of the acceleration sensor 28 having a response speed different from that of the stroke sensor 25, a temporal phase difference between the value using the detection value of the stroke sensor 25 and the output value of the acceleration sensor 28 is reduced. As a result, the deviation between the stroke amount detected by the stroke sensor 25 and the actual stroke amount is likely to decrease, and thus the detection accuracy of the stroke sensor 25 is likely to increase.

Similarly, the control device 100 performs a process of bringing the response speed of the stroke sensor 25 close to the response speed of the angular velocity sensor 29 when the value using the detection value of the stroke sensor 25 is extracted at a timing determined by using the output value of the angular velocity sensor 29 as an example of the second sensor having a response speed different from that of the stroke sensor 25.

The predetermined condition is not limited to the above condition. For example, the predetermined condition may be a case where the vehicle speed Vc is equal to or higher than the predetermined vehicle speed and the absolute value of the acceleration detected by the acceleration sensor 28 is equal to or lower than the predetermined acceleration. The predetermined condition may be a case where the vehicle speed Vc is equal to or higher than the predetermined vehicle speed, and the absolute value of the angular velocity detected by the angular velocity sensor 29 is equal to or lower than the predetermined angular velocity.

Further, the filter 141 is used to perform the process of bringing the response speed of the stroke sensor 25 close to the response speed of at least one of the acceleration sensor 28 and the angular velocity sensor 29, but the present invention is not particularly limited to this aspect. As long as the output value of the stroke sensor 25 is smoothed, a moving average may be calculated. The CPU of the control device 100 implements a function of the filter 141 by executing software stored in the ROM or the like, but the present invention is not particularly limited to this aspect. For example, the filter 141 may be configured by a physical configuration of an electronic component such as a resistor, a capacitor, or a transistor.

Second Embodiment

Figure 8:
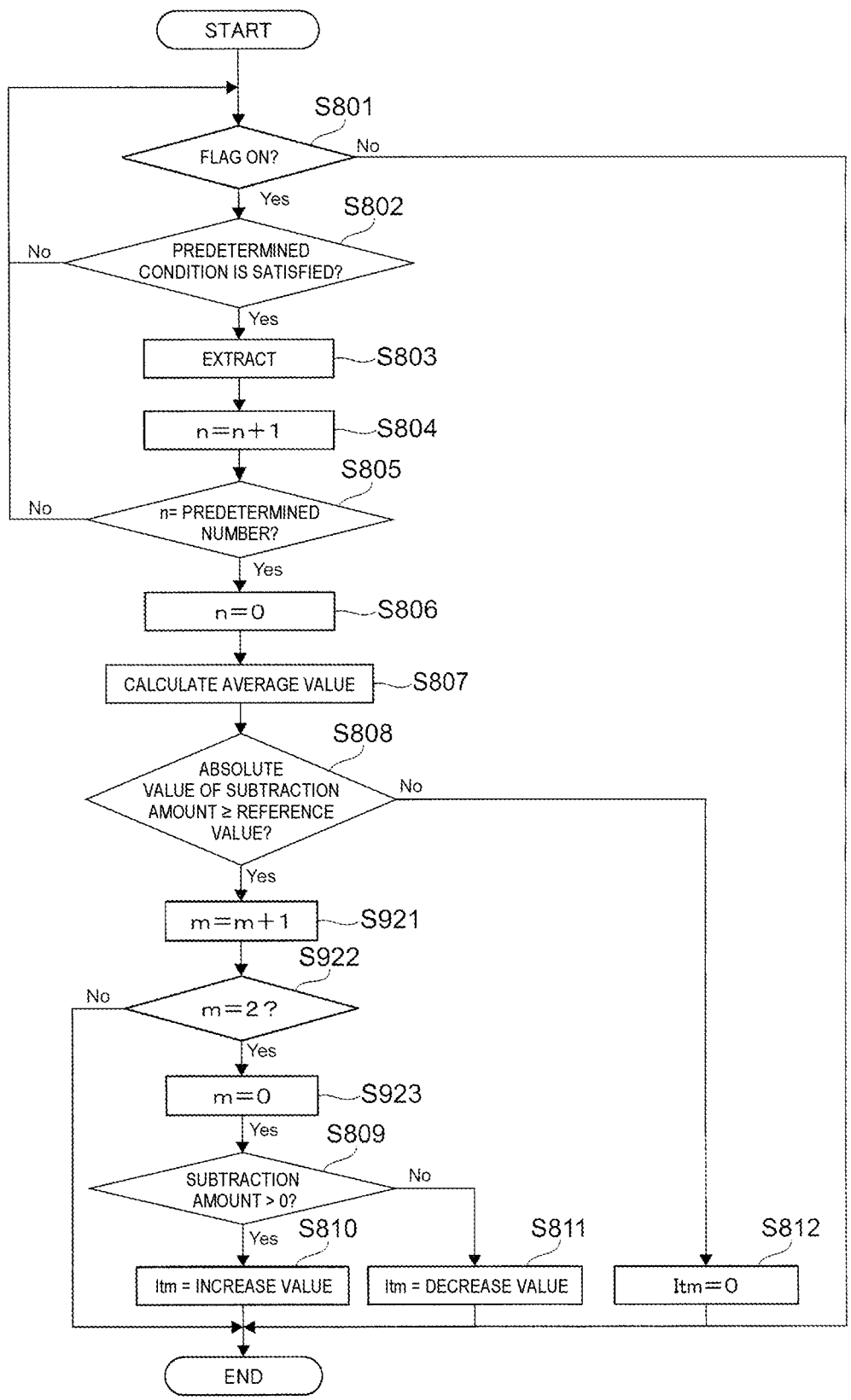
FIG. 8 is a flowchart illustrating an example of a procedure of a correction process according to a second embodiment performed by the control unit 120.

FIG. 8 is a flowchart illustrating an example of a procedure of a correction process according to a second embodiment performed by the control unit 120.

The correction process according to the second embodiment is different from the correction process according to the first embodiment in the timing when the target current Itm is set to an increase value or a decrease value in order to correct the movement amount of the support member 81. Hereinafter, differences from the first embodiment will be described. In the first embodiment and the second embodiment, the same processes are denoted by the same reference numerals, and detailed description thereof will be omitted.

The setting unit 123 continuously calculates an average value (average amount) of the plurality of extraction values. When the absolute value of the subtraction amount (=target amount−average amount) as an example of a deviation between the calculated average value and the target amount is equal to or greater than the predetermined reference value continuously for a predetermined number of times, the setting unit 123 sets the target current Itm to an increase value or a decrease value in order to bring the average value close to the target value. The predetermined number of times may be two, for example.

More specifically, as illustrated in FIG. 8, when the absolute value of the subtraction amount (=target amount−average amount) obtained by subtracting the average value (average amount) calculated in S807 from the target amount is equal to or greater than the predetermined reference value (Yes in S808), the control unit 120 adds 1 to a count value m (S921). Thereafter, it is determined whether the count value m is 2 (S922). When the count value m reaches 2 (Yes in S922), the control unit 120 sets the count value m to 0 (S923), and determines whether the subtraction amount is larger than 0 (S809). When the subtraction amount is larger than 0 (Yes in S809), the control unit 120 sets the target current Itm to an increase value (S810), and when the subtraction amount is smaller than 0 (No in S809), the control unit 120 sets the target current Itm to a decrease value (S811). On the other hand, when the count value m does not reach 2 (No in S922), the control unit 120 ends the process. Processes of S921, S922, and S923 are performed by the setting unit 123.

According to the correction process according to the second embodiment, it is possible to accurately ascertain that the suspension device 23 has no target length even though the movement amount of the support member 81 is the target value Lt. As a result, the vehicle height can be adjusted to the target height with high accuracy.

In the above embodiment, when the absolute value of the subtraction amount is continuous, that is, continues twice (m=2), the process is performed to bring the average value of the extraction values close to the target value, but the continuous number of times is not limited to twice. The number of times may be three or more. As the number of times increases, the vehicle height can be adjusted to the target height with higher accuracy.

Third Embodiment

Figure 9:
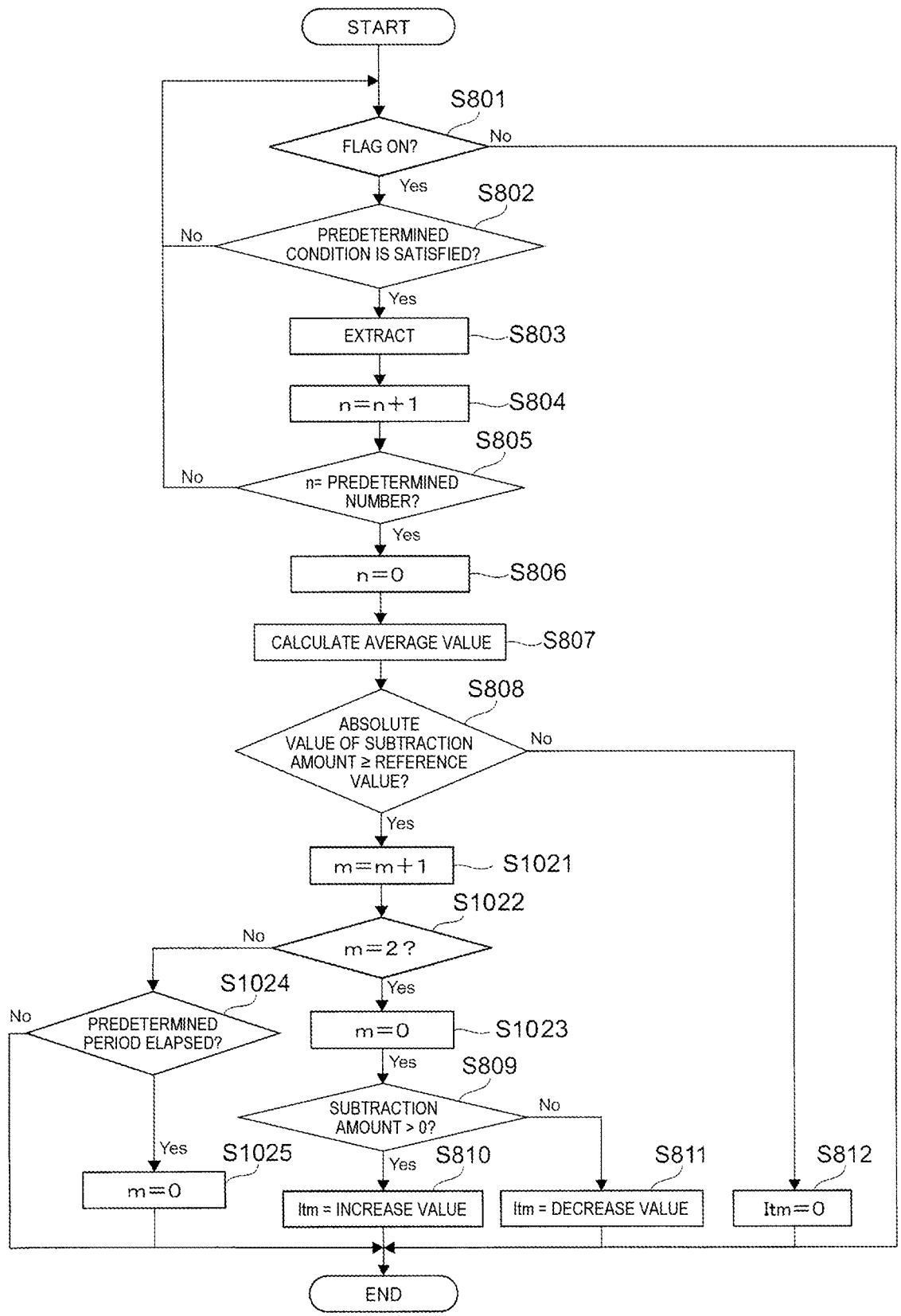
FIG. 9 is a flowchart illustrating an example of a procedure of a correction process according to a third embodiment performed by the control unit 120.

FIG. 9 is a flowchart illustrating an example of a procedure of a correction process according to a third embodiment performed by the control unit 120.

The correction process according to the third embodiment is different from the correction process according to the first embodiment in the timing when the target current Itm is set to an increase value or a decrease value in order to correct the movement amount of the support member 81. Hereinafter, differences from the first embodiment will be described. In the first embodiment and the second embodiment, the same processes are denoted by the same reference numerals, and detailed description thereof will be omitted.

The setting unit 123 calculates an average value (average amount) of the plurality of extraction values a plurality of times. When the absolute value of the subtraction amount (=target amount−average amount) as an example of a deviation between the calculated average value and the target amount is equal to or greater than the predetermined reference value for a predetermined number of times within a predetermined period, the setting unit 123 sets the target current Itm to an increase value or a decrease value in order to bring the calculated average value close to the target value. The predetermined period may be 30 seconds, and the predetermined number of times may be twice, for example.

More specifically, as illustrated in FIG. 9, when the absolute value of the subtraction amount (=target amount−average amount) obtained by subtracting the average value (average amount) calculated in S807 from the target amount is equal to or greater than the predetermined reference value (Yes in S808), the control unit 120 adds 1 to the count value m (S1021). Thereafter, it is determined whether the count value m reaches the predetermined number of times (2 in the example of FIG. 9) (S1022). When the count value m reaches 2 (Yes in S1022), the control unit 120 sets the count value m to 0 (S1023), and determines whether the subtraction amount is larger than 0 (S809). When the subtraction amount is larger than 0 (Yes in S809), the control unit 120 sets the target current Itm to an increase value (S810), and when the subtraction amount is smaller than 0 (No in S809), the control unit 120 sets the target current Itm to a decrease value (S811).

On the other hand, when the count value m does not reach the predetermined number of times (No in S1022), the control unit 120 determines whether the predetermined period has elapsed (S1024). When the predetermined period has not elapsed (No in S1024), the control unit 120 ends the process. When the predetermined period has elapsed (Yes in S1024), the control unit 120 sets the count value m to 0 (S1025), and ends the process. Processes of S1021, S1022, S1023, S1024, and S1025 are performed by the setting unit 123.

According to the correction process according to the third embodiment, it is possible to accurately ascertain that the suspension device 23 has no target length even though the movement amount of the support member 81 is the target value Lt. As a result, the vehicle height can be adjusted to the target height with high accuracy.

The invention claimed is:

1. A vehicle height adjustment device comprising:
a processing device configured to perform a process of bringing a response speed of a first sensor close to a response speed of a second sensor using a filter when a value using a detection value of the first sensor is extracted at a timing determined by using an output value of the second sensor, the second sensor being at least one of an acceleration sensor configured to detect an acceleration of a vehicle main body and an angular velocity sensor configured to detect an angular velocity of the vehicle main body, and the second sensor having a response speed different from the response speed of the first sensor which is a stroke sensor configured to detect a stroke amount of a suspension device; and
an adjustment unit configured to adjust a height of the vehicle main body, wherein
the timing is such that:
a vehicle speed is equal to or higher than a predetermined vehicle speed, an absolute value of the acceleration detected by the acceleration sensor is equal to or lower than a predetermined acceleration, and an absolute value of the angular velocity detected by the angular velocity sensor is equal to or lower than a predetermined angular velocity;
the vehicle speed is equal to or higher than the predetermined vehicle speed, and the absolute value of the acceleration detected by the acceleration sensor is equal to or lower than the predetermined acceleration; or
the vehicle speed is equal to or higher than the predetermined vehicle speed, and the absolute value of the angular velocity detected by the angular velocity sensor is equal to or lower than the predetermined angular velocity.

2. The vehicle height adjustment device according to claim 1, wherein
when values extracted from a plurality of values using detection values of the first sensor are set as extraction values, in a case where an absolute value of a deviation between an average value of the plurality of extraction values and a target amount is equal to or greater than a predetermined reference value, control is performed to bring the average value close to the target amount.

3. The vehicle height adjustment device according to claim 2, wherein
when the average value is continuously calculated and the absolute value of the deviation between the average value and the target amount is continuously equal to or greater than the reference value, control is performed to bring the average value close to the target amount.

4. The vehicle height adjustment device according to claim 3, wherein:
the adjustment unit includes:
a jack unit which is provided on the suspension device and adjusts a length of a spring;
a supply device which supplies oil to a jack chamber of the jack unit; and
a movement amount sensor which detects a movement amount of a support member supporting an end portion of the spring on the vehicle main body side;
the jack unit includes the support member and a forming member which forms the jack chamber together with the support member, and adjusts the length of the spring by moving the support member according to an amount of the oil in the jack chamber;
the supply device includes a cylinder which is tubular, a cylindrical piston which slides in the cylinder, and a lid which is disc-shaped and closes an end portion on one side of the cylinder, and a storage chamber which stores the oil is formed in a space surrounded by the cylinder, the piston, and the lid;
in the adjustment unit, when a motor of the supply device rotates in one direction, the piston discharges the oil from the storage chamber, whereby the oil is supplied into the jack chamber and the support member moves to a wheel side; and
the control for bringing the average value close to the target amount is control for moving the piston by correcting the movement amount of the support member using the average value so that a target value of the movement amount of the support member matches an detection value ascertained using the output value of the movement amount sensor.

5. A saddle-type vehicle comprising the vehicle height adjustment device according to claim 4.

6. A saddle-type vehicle comprising the vehicle height adjustment device according to claim 3.

7. The vehicle height adjustment device according to claim 2, wherein
when the average value is calculated a plurality of times and the absolute value of the deviation between the average value and the target amount is equal to or greater than the reference value a plurality of times within a predetermined period, control is performed to bring the average value close to the target amount.

8. The vehicle height adjustment device according to claim 7, wherein:
the adjustment unit includes:
a jack unit which is provided on the suspension device and adjusts a length of a spring;
a supply device which supplies oil to a jack chamber of the jack unit; and
a movement amount sensor which detects a movement amount of a support member supporting an end portion of the spring on the vehicle main body side;
the jack unit includes the support member and a forming member which forms the jack chamber together with the support member, and adjusts the length of the spring by moving the support member according to an amount of the oil in the jack chamber;
the supply device includes a cylinder which is tubular, a cylindrical piston which slides in the cylinder, and a lid which is disc-shaped and closes an end portion on one side of the cylinder, and a storage chamber which stores the oil is formed in a space surrounded by the cylinder, the piston, and the lid;
in the adjustment unit, when a motor of the supply device rotates in one direction, the piston discharges the oil from the storage chamber, whereby the oil is supplied into the jack chamber and the support member moves to a wheel side; and the control for bringing the average value close to the target amount is control for moving the piston by correcting the movement amount of the support member using the average value so that a target value of the movement amount of the support member matches an detection value ascertained using the output value of the movement amount sensor.

9. A saddle-type vehicle comprising the vehicle height adjustment device according to claim 8.

10. A saddle-type vehicle comprising the vehicle height a device according to claim 7.

11. The vehicle height adjustment device according to claim 2, wherein:
   the adjustment unit includes:
      a jack unit which is provided on the suspension device and adjusts a length of a spring;
      a supply device which supplies oil to a jack chamber of the jack unit; and
      a movement amount sensor which detects a movement amount of a support member supporting an end portion of the spring on the vehicle main body side;
   the jack unit includes the support member and a forming member which forms the jack chamber together with the support member, and adjusts the length of the spring by moving the support member according to an amount of the oil in the jack chamber;
   the supply device includes a cylinder which is tubular, a cylindrical piston which slides in the cylinder, and a lid which is disc-shaped and closes an end portion on one side of the cylinder, and a storage chamber which stores the oil is formed in a space surrounded by the cylinder, the piston, and the lid;
   in the adjustment unit, when a motor of the supply device rotates in one direction, the piston discharges the oil from the storage chamber, whereby the oil is supplied into the jack chamber and the support member moves to a wheel side; and
   the control for bringing the average value close to the target amount is control for moving the piston by correcting the movement amount of the support member using the average value so that a target value of the movement amount of the support member matches an detection value ascertained using the output value of the movement amount sensor.

12. A saddle-type vehicle comprising the vehicle height adjustment device according to claim 11.

13. A saddle-type vehicle comprising the vehicle height adjustment device according to claim 2.

14. A saddle-type vehicle comprising the vehicle height adjustment device according to claim 1.

* * * * *